(12) United States Patent
Sheaf et al.

(10) Patent No.: US 8,161,754 B2
(45) Date of Patent: Apr. 24, 2012

(54) CONTINUOUSLY VARIABLE FLOW NOZZLE ASSEMBLY

(75) Inventors: Christopher Thomas John Sheaf, Derby (GB); Miles Thomas Trumper, Leicestershire (GB)

(73) Assignee: Rolls-Royce PLC (GB)

( * ) Notice: Subject to any disclaimer, the term of this patent is extended or adjusted under 35 U.S.C. 154(b) by 1118 days.

(21) Appl. No.: 11/957,625

(22) Filed: Dec. 17, 2007

(65) Prior Publication Data

US 2008/0166227 A1    Jul. 10, 2008

(30) Foreign Application Priority Data

Jan. 6, 2007 (GB) .................................. 0700238.9

(51) Int. Cl.
*F02K 1/00* (2006.01)
*B63H 11/10* (2006.01)

(52) U.S. Cl. ..................................... 60/771; 239/265.19

(58) Field of Classification Search .................... 60/770, 60/771, 226.1, 226.3, 235, 262; 415/231.1, 415/220; 239/265.43
See application file for complete search history.

(56) References Cited

U.S. PATENT DOCUMENTS

| 4,007,587 | A | * | 2/1977 | Banthin et al. | 60/204 |
|---|---|---|---|---|---|
| 5,267,438 | A | * | 12/1993 | Bunel et al. | 60/226.2 |
| 7,216,831 | B2 | * | 5/2007 | Wood | 244/99.8 |
| 2006/0000211 | A1 | * | 1/2006 | Webster | 60/527 |
| 2009/0288387 | A1 | * | 11/2009 | Baltas | 60/204 |
| 2010/0089028 | A1 | * | 4/2010 | Baltas | 60/204 |

FOREIGN PATENT DOCUMENTS

| EP | 1462615 A1 | 3/2003 |
|---|---|---|
| GB | 2149022 A | 6/1985 |
| GB | 2372296 A | 8/2002 |
| SU | 1517417 A1 | 7/1987 |

* cited by examiner

*Primary Examiner* — Ehud Gartenberg
*Assistant Examiner* — Gerald Sung
(74) *Attorney, Agent, or Firm* — McCormick, Paulding & Huber LLP

(57) ABSTRACT

Varying the fan nozzle flow area in a gas turbine engine allows adjustment of the bypass flow for varying operational conditions such as cruise and take off. However, care must be taken with regard to variation in order not to introduce drag or operational susceptibility to failure. By provision of a deformable member having a contiguous surface, which is deformed laterally from a splitter such as a pylon variation in flow area is achieved. A deformable member will be secured through seals to ensure a smooth surface. Actuation may be through a shape memory alloy material or provision of mechanical actuators to cause deformation of the contiguous surface.

17 Claims, 4 Drawing Sheets

CONTINUOUSLY VARIABLE FLOW NOZZLE ASSEMBLY

CROSS-REFERENCE TO RELATED APPLICATION

This application is entitled to the benefit of British Patent Application No. GB 0700238.9 filed on Jan. 6, 2007.

FIELD OF THE INVENTION

The present application relates to nozzle assemblies and more particularly to nozzle assemblies utilized with respect to variation in the area of a fan nozzle in a gas turbine engine.

BACKGROUND OF THE INVENTION

It is known to provide gas turbine engines with a fan nozzle throat area which can be varied to control fan working lines and reduce jet plume shock noise in cruise configuration and at take off. Variation in the fan nozzle area will allow tuning and control of the bypass flows in the engine for particular conditions that is to say at take off or during landing. It will be appreciated by varying the available area adjustments in the gas flow speed and orientation can be achieved.

Previous nozzle assemblies have been devised incorporating flaps or variations in the cowlings and nacelle surface used to vary the fan flow area through a gas turbine engine. In WO 03060312 use of a flap mounted in an area between a nacelle and an engine cowling is shown in which the flap moves inwardly and outwardly in order to vary the variable flow area. In JP 2001 050110 flexible tubes are located within the engine core cowling in order to expand into the gap between that cowling and a nacelle to again vary the available flow area.

These prior approaches have a number of disadvantages including a considerable increase in drag due to the formation of wake and recirculation regions behind the flaps. Such assemblies may also introduce flow unsteadiness due to flow separation within the bypass duct assembly between a nacelle and a core. There are also potential problems with regard to altering the aerodynamic loads, which can result in structural constraints or implications with regard to design. It will also be appreciated the potential utilisation of chevrons and other shaping to nozzle trailing edges means it may be difficult to incorporate flaps or flexible tubes as described above in order to vary flow area. With regard to use of elastic surfaces it will also be appreciated that the air and gas flows passing through a nozzle assembly may extend over a wide range of temperatures from below 0° C. to in excess of 100° C. and these temperature ranges may cause difficulties with respect to the operation of deflectable flaps or inflatable members.

SUMMARY OF THE INVENTION

In accordance with aspects of the present invention there is provided a gas turbine engine having an engine core and a variable area nozzle assembly, the engine core is supported by a splitter that extends from a casing to define a flow area between it and the engine core, the assembly is characterised in that the splitter comprises a surface, part of the surface is defined by a deformable member that is deformable laterally to vary the flow area.

Typically, the deformable member comprises a sealed plate. Possibly, the deformable member comprises a shape memory material.

Typically, the deformable member is deformed by a mechanical actuator. Possibly, the mechanical actuator is an electromagnetically or electromechanically driven screw jack or a hydraulic ram or a pneumatic ram.

Possibly, the deformable member is deformed by heat.

Possibly, the deformable member is deformed by bending through an actuator acting upon an intermediate part of the deformable member. Possibly, the deformable member is deformed by compressive bending as a result of pushing from one or both ends of the deformable member through guides.

Possibly, the deformable member is associated with the splitter with a seal to the remaining parts of the pylori for aerodynamic continuity. Possibly, the seal comprises one or more elements providing a flexible seal bridge between the deformable member and the remaining parts of the pylori.

Possibly, the deformable member is presented upon rods for support during deformation.

Possibly, the deformable member is biased to an un-deformed state. Possibly, the deformable member is configured and returns to the un-deformed state when not supported by an actuator against in situ pressure differentials in use across the contiguous surface.

Generally, there are two splitters in a nozzle assembly.

Generally, deformable member are provided laterally on either side of the splitter. Normally, the contiguous surfaces are deformable to be balanced either side of the splitter.

Typically, the splitter is a pylori or bifurcation within an engine.

DETAILED DESCRIPTION OF THE PREFERRED EMBODIMENTS

Figure 1:
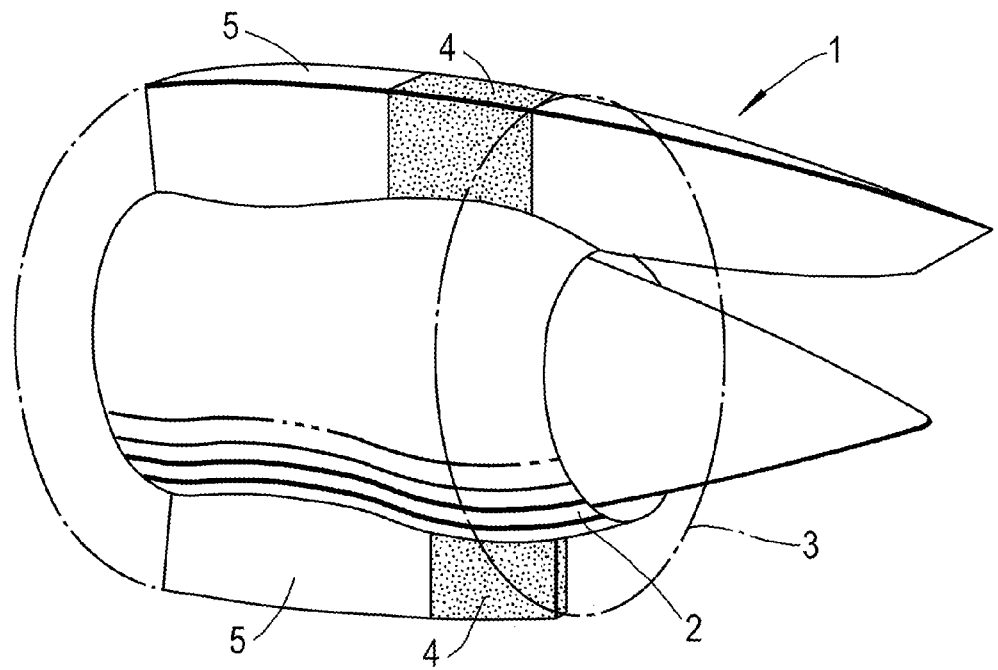
FIG. 1 is a schematic rear perspective view of a gas turbine engine incorporating a nozzle assembly in accordance with aspects of the present invention in a stowed state.

As indicated above it is advantageous to be able to vary the flow area within a gas turbine engine. Thus, as depicted in FIG. 1 as a rear schematic perspective view of a gas turbine engine 1, a core 2 defines a central part of the engine 1 with a surrounding nacelle 3. Between the core cowling 2 and the nacelle 3 a flow path is defined having a flow area variable in accordance with aspects of the present invention by deformation of a deformable member 4 which defines a contiguous surface 4 with the remainder of a splitter 5. As can be seen, this contiguous surface 4 is part of two splitters 5 in a bifurcated structure which generally supports and presents the respective core 2 and nacelle 3. The splitters 5 may be pylons or other bifurcations with the engine 1. It will be understood by deforming the contiguous surface 4 that the surface 4 bulges laterally narrowing and varying the flow area between the core 2 and the nacelle 3.

Figure 2:
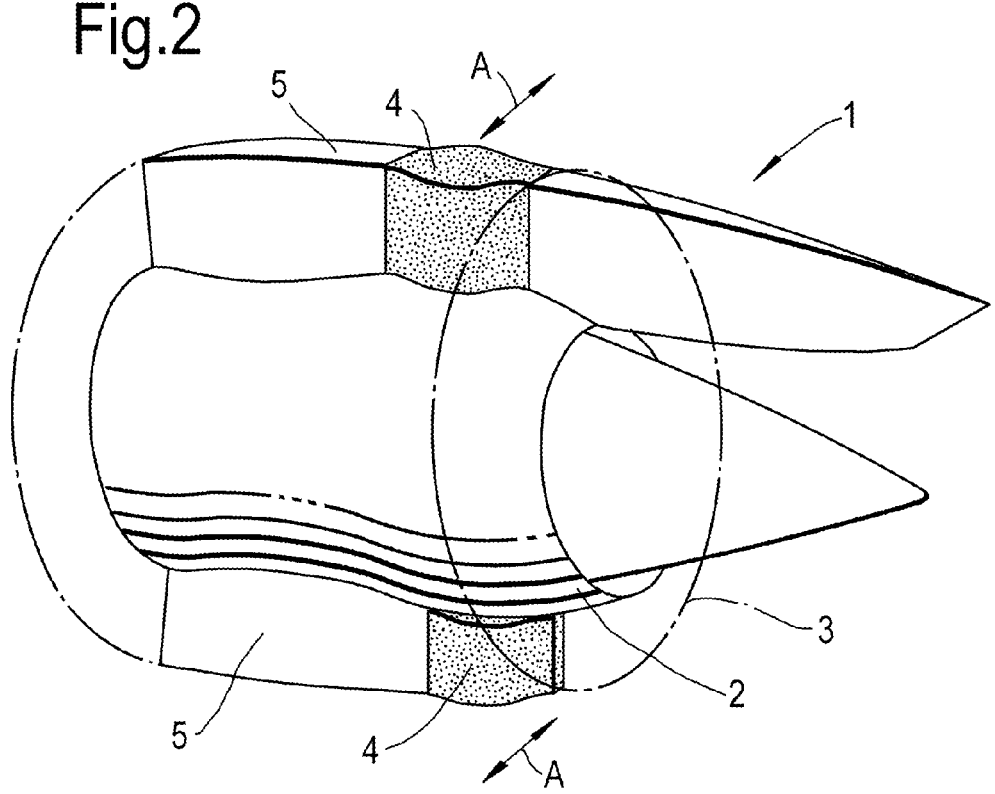
FIG. 2 is a schematic rear perspective view of the gas turbine engine depicted in FIG. 1 in a deployed configuration.

In accordance with aspects of the present invention, the deformable member has a contiguous surface 4 that is designed to provide smooth continuous flow paths without distortions or steps typical with prior assemblies. The lateral deformation of the contiguous surface 4 is depicted in a deployed state in FIG. 2. Thus, as can be seen, the contiguous surface 4 laterally deforms in the direction of arrowheads A and typically symmetrically about the splitters 5 and is balanced between the splitters 5 to adjust the flow area between the core 2 and the nacelle 3. The lateral deformation of the deformable member 4 takes the form of a bulge, which, as indicated, extends between the core 2 and the nacelle 3. Although illustrated in both splitters 5 it will be appreciated that contiguous surfaces for deformation to adjust flow area can be provided in one, whether that be the upper or lower splitter 5, or both.

Means for causing deformation of the contiguous surfaces 4 may include mechanical actuators as well as shape memory materials or both. It will be appreciated that the actuator mechanism will be chosen to provide a suitably robust response with an appropriate deformation length as well as suitability for the environmental conditions expected within the gas turbine engine 1.

Figure 3:
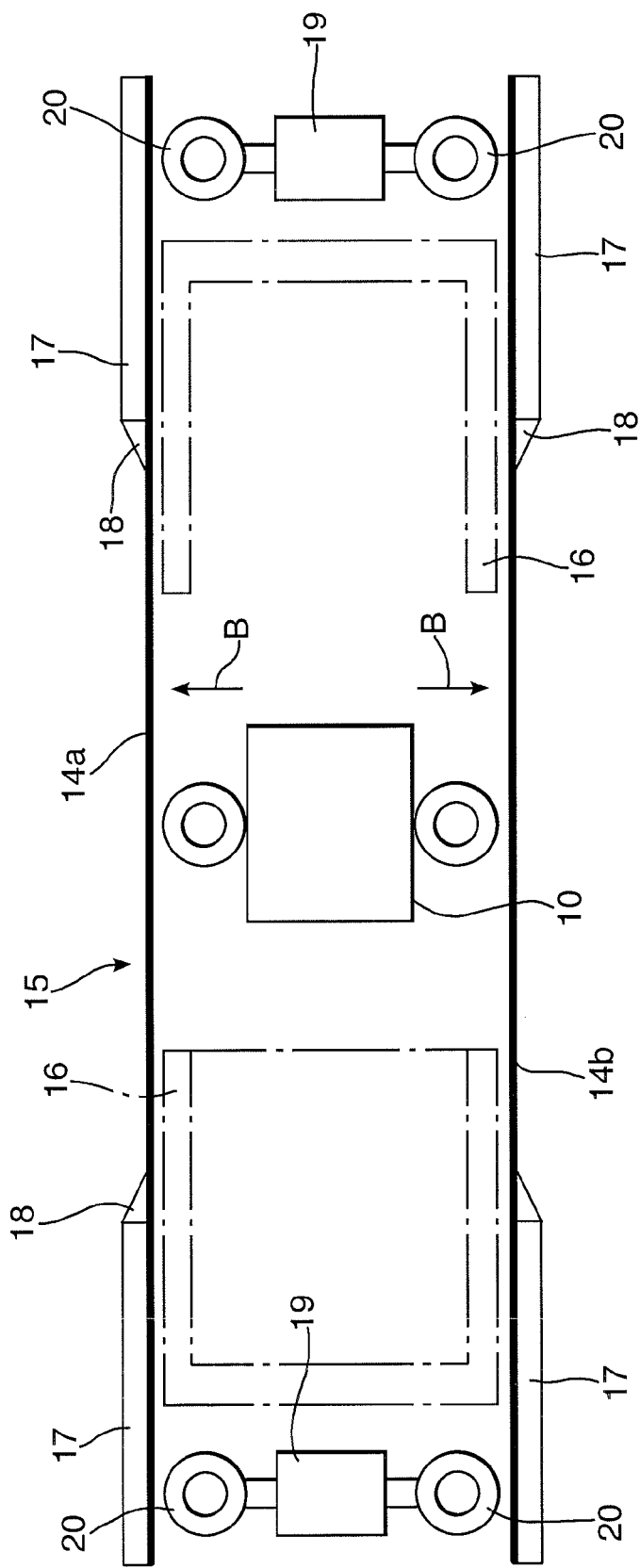
FIG. 3 is a schematic plan illustration of a first embodiment of a splitter incorporated in a nozzle assembly in a stowed state.
Figure 4:
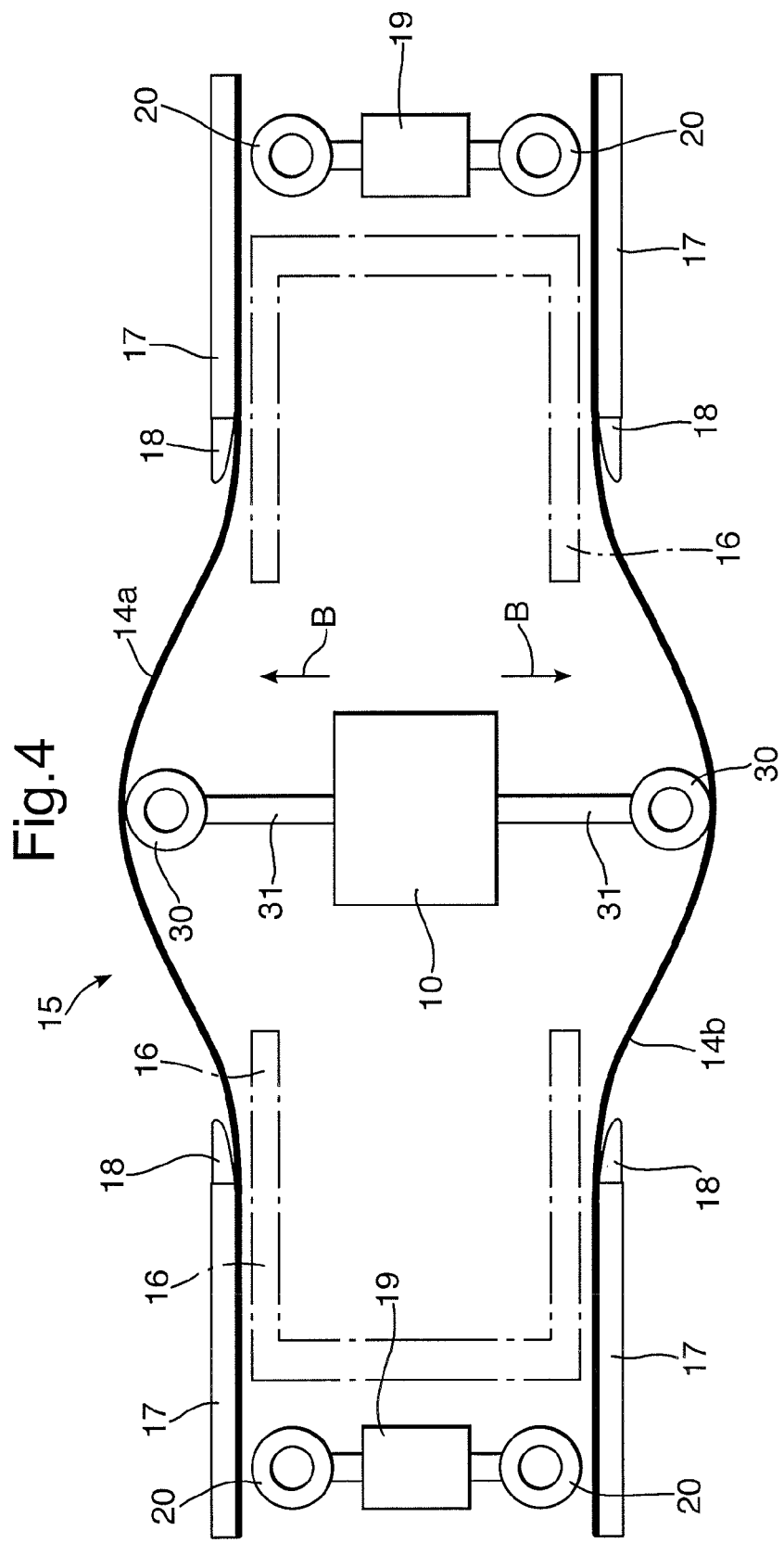
FIG. 4 is a schematic illustration of the splitter depicted in FIG. 3 in a deployed state.

FIGS. 3 and 4 illustrate a first embodiment of an actuator mechanism within a splitter for a nozzle assembly in accordance with aspects of the present invention. The first embodiment depicted in FIGS. 3 and 4 relates to provision of a mechanical actuator 10, which engages a contiguous surface 14 either side of a splitter 15. The splitter 15 has an internal structure 16 with the contiguous surface 14a located across a gap in the external surfaces 17 of the pylori 15. The contiguous surface 14a is continuous and provides a substantially continuous external surface for the splitter 15 through provision of flexible seals 18 and appropriate presentation on the structure 16. It will also be noted that the contiguous surface 14a extends substantially below the external surface 17 and is supported upon spring guides 19 including rollers 20 to ensure appropriate presentation and typically compressive engagement to facilitate the seal against an underside of the external surface 17 of the splitter 15.

The deformable member 14 is generally flexible and therefore when the mechanical actuator 10 causes lateral displacement in the direction of arrowheads B it will be appreciated that the surface 14 is deformed and bulges outwardly drawing the surface 14 over the guides 19 as depicted in FIG. 4.

This lateral displacement is achieved by the actuator 10 acting through rollers 30 upon rods 31. Rollers 30 or similar low friction devices are advantageous to allow ready movement of the contiguous surface 14 in use.

As can be seen, the support rollers 20 upon the guides 19 ensure appropriate presentation of the surface 14 in use. It will be noted that the seals 18 are designed to engage against the surface 14 to maintain a contiguous nature in association with the exterior surface 17 of the splitter 15.

The degree of extension of the rods 31 will clearly alter the deformation of the surface 14 inwardly within a flow area of a nozzle assembly in accordance with aspects of the present invention. The extent of deformation of the rods 31 can be adjusted to particular requirements and therefore variation in the nozzle area presented within a gas turbine engine as described previously with regard to FIGS. 1 and 2.

The mechanical actuators 10 in accordance with aspects of the present invention may take the form of an electromagnetic or electromechanical driven screw jack in which an electric motor turns a screw thread in order to cause displacement of the rods 31. Alternatively, the mechanical actuator 10 may take the form of a hydraulic or a pneumatic ram forcing displacement of the rods 31 and therefore deformation of the surfaces 14. It will be understood that, as indicated, the extent of displacement of the rods 31 and therefore bulging or deformation of the surfaces 14 will be controlled to alter the flow area within a gas turbine engine nozzle assembly. In such circumstances typically a control device (not shown) will be arranged to specifically vary the displacement of the rods 31 in use as required.

In the embodiment depicted in FIG. 3, it will be appreciated that the actuator 10 engages the surface 14 from below at a central intermediate location and therefore draws the surface 14 over the rollers 20 into the deformed bulging configuration depicted in FIG. 4. Such an assembly ensures that a good seal is presented by the seal elements 18 and a substantially contiguous surface maintained along the sides of the splitter 15 in use.

Figure 5:
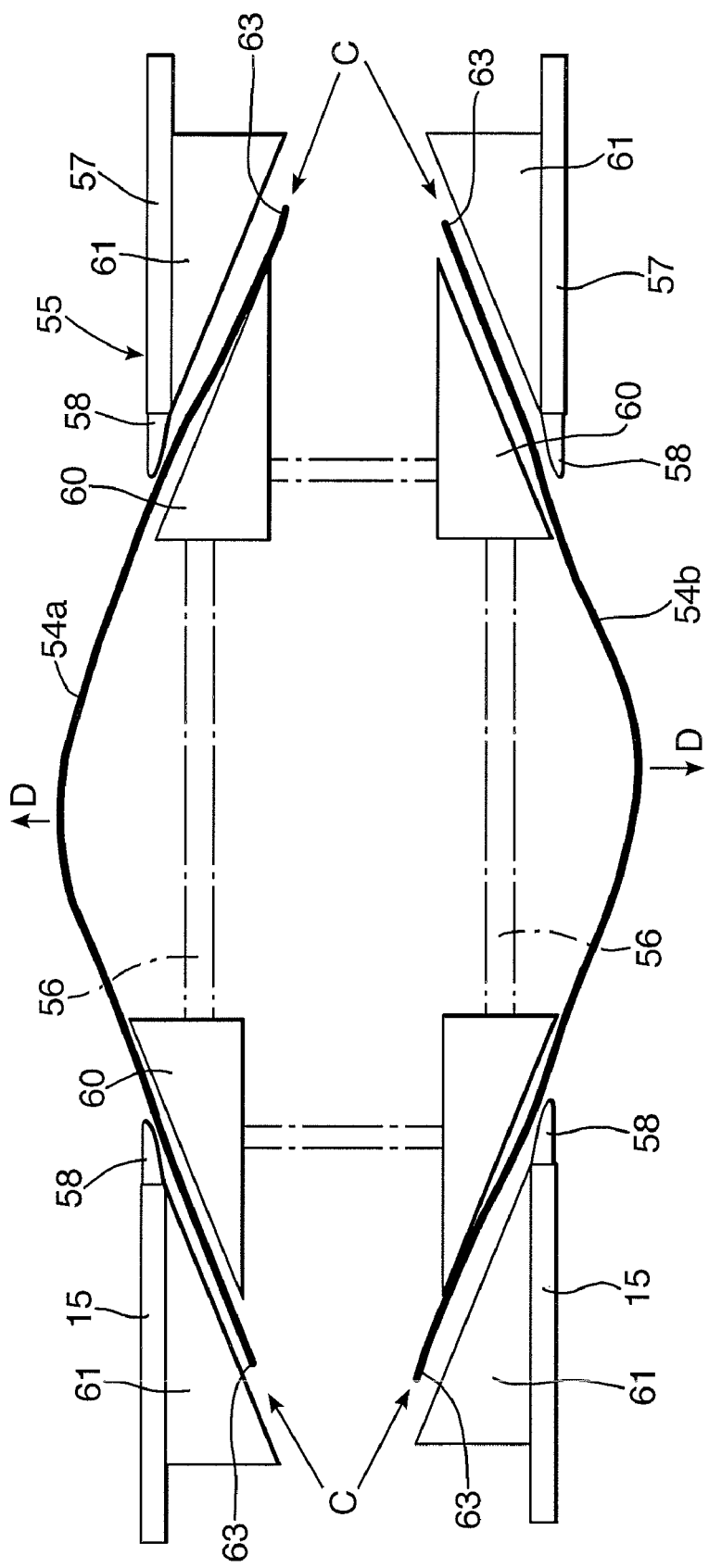
FIG. 5 is a schematic plan view of a second embodiment of a splitter in a nozzle assembly in accordance with aspects of the present invention.

An alternative second embodiment of a splitter 55 is depicted in FIG. 5 in which, as previously, the splitter 55 has exterior surfaces 57 which have an opening across which a contiguous surface 54 extends. The pylori 55 includes a structure 56 upon which guides 60 are presented to act in association with splitter guides 61 in order to present the contiguous surface 54. In such circumstances actuators are provided in use to push respective ends 63 of the surfaces 54 in the direction of arrowheads C. The surface 54 bulges outwardly in the direction of arrowheads D in order to alter the flow area in a nozzle assembly in accordance with aspects of the present invention. It will be appreciated that as previously the surface 54 is generally contiguous with the exterior surface 57 of the splitter 55 and seals 58 are provided to ensure a closed surface with smooth transitions between the surface 54 and the exterior surface 57 of the splitter 55.

It will be noted that the guide features 60, 61 define a gap at an angle for orientation of the surface 54. Although depicted as straight, it will be appreciated that these features 60, 61 may define a curved aspect for presentation of the surface 54 and one or both of the features 60, 61 may move to adjust the guide channel between them appropriately for operational purposes.

A third approach with regard to orientating bulging for lateral deformation is through use of a shape memory alloy in relation to the contiguous surface. In such circumstances a heating assembly or simply the temperature of the air flow past the contiguous surface may cause deformation in the contiguous surface profile in use. Generally, the shape memory alloy will take the form of a plate in order to define the contiguous surface. This plate will be supported by rollers and/or other support mechanisms to facilitate the deformation and support such deformation in use.

Generally, the deformable member in accordance with aspects of the present invention will be configured in order to be biased to a non deployed configuration. In such circumstances should the actuation mechanism fail the contiguous surface 4 as depicted in FIG. 1 will be biased towards that non deployed and stowed configuration rather than frozen in the deployed configuration depicted in FIG. 2. However, alternatively, it will be appreciated that the bias may be towards a deployed configuration where that is most appropriate for operational performance within a gas turbine engine.

It will be appreciated it is deployment of the deformable member in accordance with aspects of the present invention which is important. In such circumstances single or multiple actuation mechanisms may be utilised in order to cause appropriate deformation of the contiguous surface in order to vary the flow path area in a gas turbine engine. It will be understood that providing one or more actuator mechanisms will provide potentially greater flexibility with regard to the deployment episodes and also provide a degree of redundancy with respect to failure of any particular actuator mechanism in use. The use of a single point to drive the deformation of the contiguous surface may be augmented by provision of an already contoured plate or plate to form the contiguous surface which is formed from a shape memory alloy.

It will be appreciated that provision of sealing between the contiguous surface and the normal outer surface of a splitter is important in order to avoid flow leakage as well as to ensure a smooth aerodynamic surface eliminating problems with regard to wake and recirculation in an assembly in accordance with aspects of the present invention. Typically, the seals 18, 58 as indicated will be flexible and take the form of so called "turkey feathers" which comprise tabs or leaves of material which extend over the contiguous surface in order to provide a sealing band. Furthermore, as indicated above, sprung loaded rollers 20 in a guide 19 may be arranged to cause an abuttive engagement between the contiguous surface and an underside of the splitter 15 to again facilitate sealing with the distortion and deformation of the contiguous surface acting against the seals. It will be appreciated that the seals are generally flexible and therefore the distortion will cause compression against the seals again forming a robust seal in use with no flow disruptive steps.

As indicated, bias towards a stowed configuration provides advantages with respect to achieving a fail-safe operational state predicatively should the actuation mechanism fail. In such circumstances, the contiguous surface in the form of a plate will generally be forced to return to its stowed underlying support structure shaping by a higher than ambient static pressure in the flow area above the contiguous surface in use.

As indicated above, generally nozzle assemblies in accordance with aspects of the present invention will comprise splitters, in the form of pylons or other bifurcations, which extend in a bifurcated manner from a central core to support that core within a nacelle housing. The area between the core and the nacelle defines a flow path whose area is varied by deformation of the contiguous surface in accordance with aspects of the present invention. In such circumstances deformation can be symmetrical across each side of a splitter and between splitters or alternatively differential deformations can be achieved to provide different flow constriction in the flow area about the circumference of a gas turbine engine.

Provision of a deformable member in the form of a contoured plate provides advantages in comparison with prior systems by significantly reducing pressure loss as a result of sudden discontinuities and therefore lowering aerodynamic loading upon the contiguous surface and therefore the nozzle assembly in accordance with aspects of the present invention. It will also be noted that the contiguous plate does not require the use of elastic surfaces to allow deflection as described above in one approach to altering flow area and in such circumstances is more mechanically robust. It will also be understood dependent upon the deformation range for the contiguous surface there is a potential for infinite variable change in the flow area within a range allowing more precise variation for matching to operational requirements as well as noise generation by gas flows through a gas turbine engine.

Modifications and alterations to the embodiments of the present invention described above will be appreciated by those skilled in the art. Thus for example, where appropriate the assembly may include one or more than two splitters incorporating deformable members in accordance with aspects of the present invention. Furthermore, rather than providing a sinusoidal or smooth rounded deformation it will be appreciated that where appropriate the contiguous surface may adopt a smooth wedge shape with a non symmetrical slope profile but such an assembly may create drag. It will also be appreciated the deformable member may be arranged to form a dome deformation where appropriate.

We claim:

1. A gas turbine engine comprising:
   an engine core; and
   a variable area nozzle supported by a splitter that extends from a casing to define a flow area between the casing and the engine core;
   an assembly with the splitter including a deformable member that is deformable laterally between a stowed configuration and a range of deformed configurations to continuously vary the flow area, the deformable member defining a continuous surface with the remainder of the splitter in both the stowed configuration and the range of deformed configurations.

2. A gas turbine engine as claimed in claim 1 wherein the deformable member further comprises a sealed plate.

3. A gas turbine engine as claimed in claim 1 wherein the deformable member further comprises a shape memory material.

4. A gas turbine engine as claimed in claim 1 wherein the deformable member is deformed by a mechanical actuator.

5. A gas turbine engine as claimed in claim 4 wherein the mechanical actuator is an electromagnetically or electromechanical driven screw jack or a hydraulic ram or a pneumatic ram.

6. A gas turbine engine as claimed in claim 1 wherein the deformable member is deformed by heat.

7. A gas turbine engine as claimed in claim 1 wherein the deformable member is deformed by bending through an actuator acting upon an intermediate part of the deformable member.

8. A gas turbine engine as claimed in claim 1 wherein the deformable member is deformed by compressive bending as a result of pushing from one or both ends of the deformable member through guides.

9. A gas turbine engine as claimed in claim 1 wherein the deformable member is associated with the splitter with a seal to the remaining parts of the splitter for aerodynamic continuity.

10. A gas turbine engine as claimed in claim 9 wherein the seal further comprises one or more elements providing a flexible seal bridge between the deformable member and the remaining parts of the splitter.

11. A gas turbine engine as claimed in claim 1 wherein the deformable member is presented upon rods for support during deformation.

12. A gas turbine engine as claimed in claim 1 wherein the deformable member is biased to an un-deformed state.

13. A gas turbine engine as claimed in claim 12 wherein the deformable member is configured and returns to the un-deformed state when not supported by an actuator against in situ pressure differentials in use across the deformable member.

14. A gas turbine engine as claimed in claim 1 wherein said nozzle assembly further comprises a second splitter.

15. A gas turbine engine as claimed in claim 1 wherein said nozzle assembly further comprises a second deformable member.

16. A gas turbine engine as claimed in claim 15 wherein the deformable members are deformable to be balanced on either side of the splitter.

17. A gas turbine engine as claimed in claim 1 wherein the splitter further comprises a pylon or bifurcation wall within a gas turbine engine.

* * * * *